United States Patent [19]

Harvey

[11] Patent Number: 4,973,996
[45] Date of Patent: Nov. 27, 1990

[54] FILM DRIVE CONTROL IN DATA ENTRY CAMERA

[75] Inventor: Donald M. Harvey, Webster, N.Y.

[73] Assignee: Eastman Kodak Company, Rochester, N.Y.

[21] Appl. No.: 486,338

[22] Filed: Feb. 28, 1990

[51] Int. Cl.$^5$ .......................... G03B 17/24; G03B 1/18
[52] U.S. Cl. ................................ 354/106; 354/173.1
[58] Field of Search ...................... 354/106, 171, 173.1, 354/173.11, 212, 289.1, 105

[56] References Cited

U.S. PATENT DOCUMENTS

| | | | |
|---|---|---|---|
| 4,322,147 | 3/1982 | Motoori et al. | 354/106 |
| 4,470,677 | 9/1984 | Tsujimoto et al. | 354/106 |
| 4,583,831 | 4/1986 | Harvey | 354/106 |
| 4,588,274 | 5/1986 | Kazumi | 354/105 |
| 4,613,911 | 9/1986 | Ohta | 360/3 |
| 4,639,111 | 1/1987 | Harvey | 354/481 |
| 4,652,104 | 3/1987 | Harvey | 354/106 |
| 4,664,491 | 5/1987 | Kazumi et al. | 354/105 |

Primary Examiner—L. T. Hix
Assistant Examiner—Cassandra C. Spyrou
Attorney, Agent, or Firm—Roger A. Fields

[57] ABSTRACT

Frame-to-frame advance in a motor drive camera with frame specific data entry capability is delayed until initiation of a next exposure to maximize the time during which data relating to a latest exposure can be entered and/or corrected. A manually-entered "data entry completed" signal switch is provided to override the delay. An "enter data" reminder and data display is provided.

17 Claims, 3 Drawing Sheets

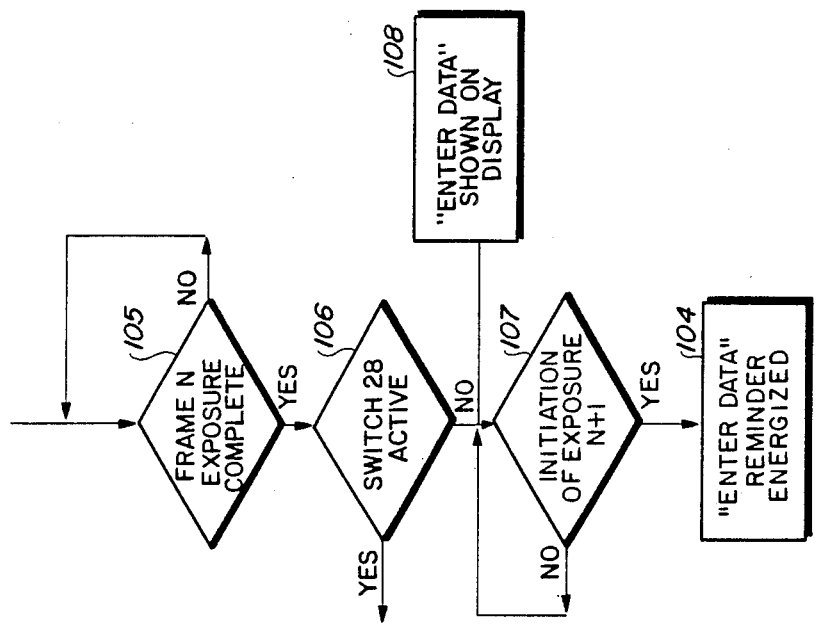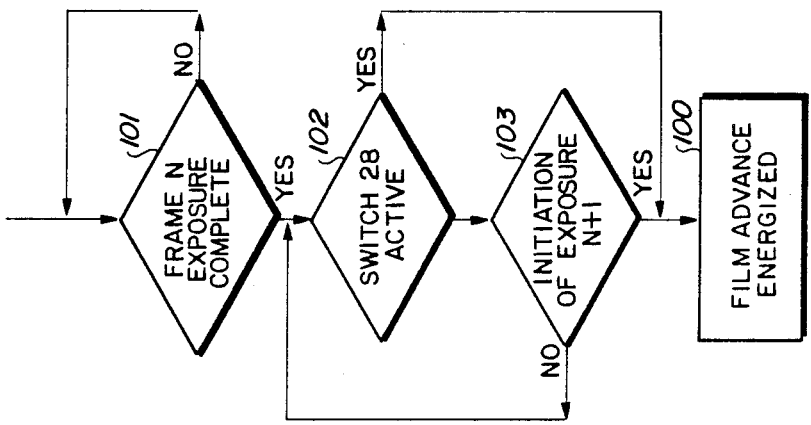

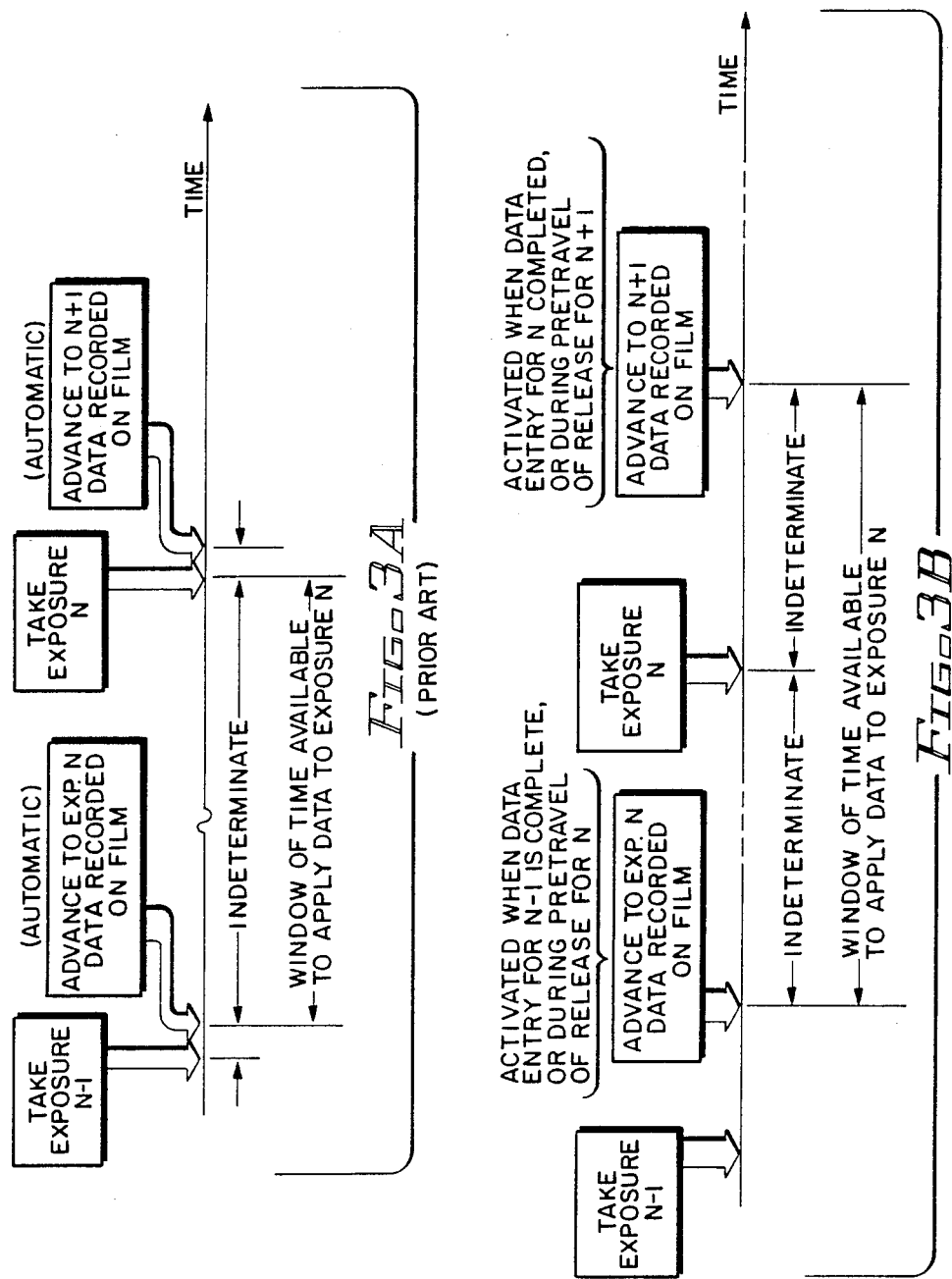

FILM DRIVE CONTROL IN DATA ENTRY CAMERA

The present invention relates generally to camera systems that record data in association with exposed photographic film; and, more particularly, to a control system for delaying the frame-to-frame advance of a filmstrip in a motor driven camera in order to increase the time available for initial entry or correction of data corresponding to an exposed film frame.

BACKGROUND OF THE INVENTION

It is known to record data marginally along a filmstrip at spaced intervals corresponding to exposed frames to which the data relates. The data may relate to exposure parameters associated with a specific frame and be recorded on the film at the time of exposure adjacent to the frame for later reference in producing prints from the developed negatives. U.S. Pat. Nos. 4,583,831; 4,652,104; and 4,639,111 to the same inventor, for example, disclose marginal encoding by optical means adjacent a frame at the time of exposure of frame specific field of view identification information in a tele/pan camera. The data may also be subject specific, such as date and time of shot, etc. Examples of so called "data back" cameras are disclosed in U.S. Pat. Nos. 4,322,147; 4,470,677; 4,588,274; and 4,664,491.

A typical means of recording such data is by exposing the film in registration with the subject image to a bank of light emitting diodes (LED's) or other optical display device at the time of or immediately following exposure of a particular frame, and prior to advancement of the film to a next available exposure frame.

Conventional frame data applying cameras that employ motorized film drives operate to normally automatically advance the film immediately following the exposure. To avoid blurring or incomplete data entry, various embodiments exist to temporarily delay advance of the film for a short period until both the primary exposure shutter operation and any data entry operation currently in progress are completed. The motor drive or winder is actuated only upon receipt of "go ahead" signals representing termination of in-process data recording and termination of the current frame exposure. Such systems advance the film after a short delay if data entry does not occur, thereby preventing subsequent initiation of delayed entry of data; and, where data entry has already occurred, film advance will occur as soon as exposure is completed, without providing any opportunity for reviewing or correcting the recorded data.

The provision of the magnetic recording track on a still camera filmstrip for the purpose of storing various frame specific data (such as date, place, photographer, exposure conditions, and other data for subsequent personal or photographic laboratory use) is disclosed in Ohta U.S. Pat. No. 4,613,911. Ohta suggests the use of such a track as a recording medium for providing the camera with information regarding film sensitivity or the number of exposed or unexposed frames.

It is a desirable objective in recording frame specific data in correlation with the exposed frames of a photographic film to maximize the amount of time available for the application and/or correction of data relating to a frame, without thereby unduly delaying the next exposure, and without preventing the high speed frame-to-frame advance desired for taking a rapid sequence of successive exposures, such as done in sports photography and the like.

One method of minimizing recording time for a rapid sequence of exposures, is to record data in conventional fashion at or immediately following exposure for the first shot, but to deactivate the data recording feature for the remainder of the same sequence. It is a desirable objective to be able to minimize the recording time for a continuous sequence of shots, but without the initial delay experienced from first to second shot of the sequence, and without thereby losing an opportunity either to enter or to correct the recorded data relating to that sequence. It is also desirable to record the number of shots in the sequence to which the data relates.

SUMMARY OF THE INvENTION

The present invention provides an apparatus and method for the control of a film drive in a data entry camera to increase the time during which data can be entered, and to provide a capability for correcting already entered data.

In accordance with the invention, a camera having a motorized drive mechanism for the frame-to-frame advance of a filmstrip for successive frame exposures includes drive control means for delaying the film advance until data entry is completed to the satisfaction of the photographer or until initiation of the exposure of a next available unexposed frame. A film drive control and data entry system according to the invention permits the initial entry of data or correction of data already entered relating to an exposed frame at any time up until initiation of the next exposure. By delaying the film's advance until receipt of a user controlled data entry completion signal or until the shutter release button is pressed for the next exposure, the time window for entering data is maximized.

A film drive control and data entry system in accordance with the invention is particularly useful when there is insufficient time prior to the occurrence of a photographic event to make and enter choices of frame specific data regarding the subject or exposure conditions. The system is also useful to permit post exposure pseudo format selection to be made for tele/pan cameras. Since the data is recorded on the film during or just prior to film advance, it is possible to provide an indication to the user that no data has been entered or to provide a capability for altering the input at any time until film advance. A data display greatly aids in keeping track of the data input and facilitates corrections.

The invention has application to data entry systems in which data is applied optically by marginal or peripheral exposure adjacent a relevant film frame image; and has particular advantages in embodiments for which the data is recorded magnetically on the film in a form that can be readily altered by subsequent overwrite using a magnetic read/write head.

BRIEF DESCRIPTION OF THE DRAWINGS

Embodiments of the invention have been chosen for purposes of description and illustration, and are shown in the accompanying drawings, wherein:

FIGS. 2A-2B are flow diagrams of the steps of a program usable in implementing the embodiment of FIG. 1; and FIGS. 3A-3B are timing sequences comparing the timing of a conventional motor drive data entry camera with the timing of the embodiment of the invention.

Throughout the drawings, like elements are referred to by like numerals.

DETAILED DESCRIPTION OF THE PREFERRED EMBODIMENTS

Figure 1:
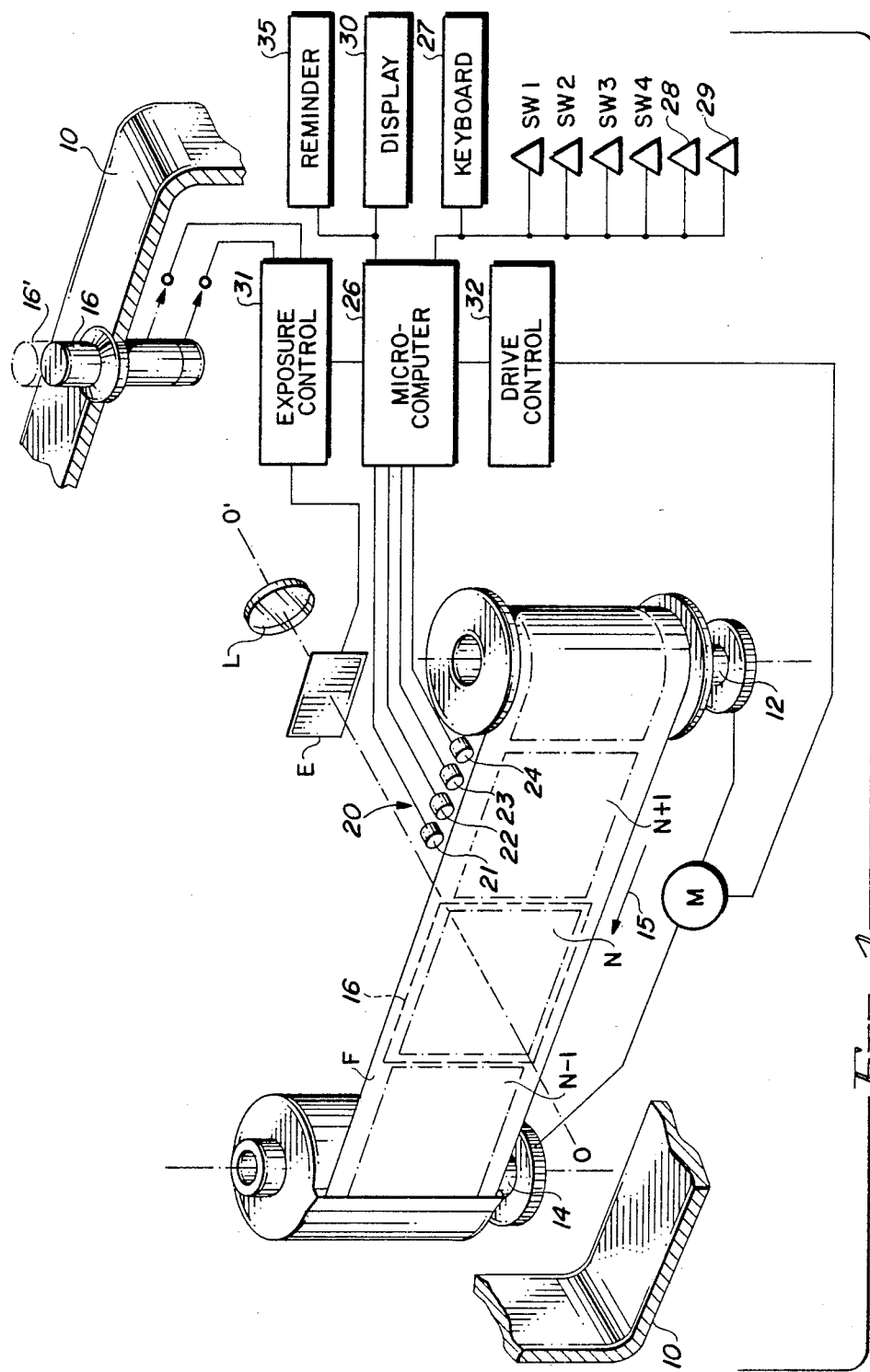
FIG. 1 is a schematic view showing the progressive movement of a filmstrip in frame-to-frame advancement in a still camera having a motorized film drive control and data entry system in accordance with an embodiment of the invention.

The principles of the apparatus and method of the invention are described with reference to an exemplary implementation of a motorized film drive control and data entry system usable in a still film camera. The system cooperates with a filmstrip F having a plurality of image frame sections N−1, N, N+1, etc., to make a plurality of frame specific data entries on a marginal portion of the film in coordination with sequential exposure of the frames.

As shown in FIG. 1, the film F is loaded in a lightproof cavity of the camera body 10 for movement between supply and take-up reels 12, 14 in a desired frame-to-frame advance direction 15 across an exposure station 16, shown in dashed lines. The station 16 is located in alignment with an optical axis O-O', so that when a frame N of the film F is positioned in registration with the station 16, it can be exposed by light passing from a subject to be photographed through a lens L, when an exposure gate E is actuated, such as in response to full depression (to the solid line positions in FIG. 1) of a shutter release button 17.

After exposure of a particular frame N, a drive motor M is actuated to move the loaded film F in the direction 15 for a distance corresponding to one frame interval, to bring a next available unexposed frame N+1 into registration with the exposure station 16, and so forth, for successive film exposures.

In connection with the frame-to-frame advance of the film F, it is desired to enter frame specific information, such as exposure data, pseudo format selection, time and date of exposure, etc., onto the film F in correspondence with the exposed frames. For this purpose, a data recording head 20 is located adjacent a marginal edge of the film F to record data in a marginal location adjacent the exposed frame N. The recording head 20 may, for example, comprise a plurality of light emitting diodes (LED's) 21, 22, 23, 24, such as disclosed in the above-referenced tele/pan patents which are positioned to record data by optical means onto the film F. The head 20 may also take the form of a magnetic read/write head located in a manner similar to that described for the read head in copending, commonly-owned U.S. patent application Ser. No. 07/457,467, to the same inventor, filed Dec. 27, 1989. The head may also take the form of an illuminated liquid crystal display (LCD), similar to the type utilized in U.S. Pat. No. 4,664,491.

The data recording head 20 is connected to receive data under control of a microcomputer unit 26 from data input devices, such as switches SW1-SW4 (which may be pseudo format switches, for example); a keypad or keyboard 27 (connected to apply user-initiated data) and/or user input, dedicated entry keys 28, 29. For user convenience, it may be desirable to supply an LCD or similar visual display 30, as an aid to entry and verification of recorded data.

The microcomputer 26 is also electrically connected to camera exposure and the camera drive control circuits 31, 32. The connection with the exposure control circuit 31 provides the microcomputer 26 with exposure initiation (e.g., shutter release switch in partially depressed position 16') and exposure completion signals. The electrical connection to the drive control circuit 32 provides the interface between the microcomputer 26 and the film transport drive motor M.

In accordance with the invention, the control circuit 32 functions under the direction of microcomputer 26 to drive the motor M to advance the film F to bring a next unexposed frame N+1 into registration with the exposure station 16, in response to a next exposure initiation signal (for exposure of frame N+1) received by the microcomputer 26 from the exposure control circuit 31. This is in contrast to conventional data entry systems wherein film drive is initiated in response to receipt of an exposure completion signal, which unduly limits the amount of time during which data may be entered on the film F before advancement to the next frame N+1. By waiting until initiation of exposure of a next frame N+1 (e.g., such as on partial depression to position 16' of the shutter release switch occurs), the marginal area adjacent the just exposed frame N remains available for recording data for a greater length of time. (The frame advance indicator observable to the photographer can be advanced earlier, so that the dwell of the already exposed frame at the exposure station until start of the next exposure does not interfere with the exposed frame count.)

In the case of a data recording head 20, such as a bank of LED's 21, 22, 23, 24 for recording pseudo formats in a tele/pan camera, this additional frame advance delay gives the photographer an opportunity to consider adding a coding to signal to pseudo telephoto or pseudo panoramic for subsequent printing, even after the exposure is completed and at any time up until initiation of the next exposure. In the case of other user initiated input, where a user does not have time before making an exposure to enter the desired data, this gives additional time to permit an opportunity to do so after the exposure is made. In the case of a head 20 in the form of a magnetic read/write head, or similar mechanism having a data erase or write-over capability, this also gives an opportunity to change already entered data prior to initiation of the next exposure. Consider, for example, a situation wherein information as to the date and time of exposure is entered on the film adjacent an exposed frame, before it is recognized that the date is incorrect. Conventional systems would have advanced the film and prevented correction of the error; however, with the film drive control and data entry system in accordance with the invention, the opportunity still exists to correct the data.

Provision can optionally be made for manual entry of a data entry completion signal, such as by setting a switch 28, to initiate advance to the next frame N+1 when desired by the user, such as when the user is satisfied data has been correctly entered. Another button 29 may be configured to signal a high speed drive mode for exposing a series of frames in rapid succession. Upon setting of the switch 29, the microcomputer 26 will control the drive circuit 32 to maintain the film motor M in an energized state without the necessity for data entry during a continuous succession of exposures, with the film advancing immediately upon completion of exposure. In accordance with the invention, the sequence can be shot quickly without waiting for any data entry, and the data corresponding to information for that sequence can be entered following the shooting of the last frame, not between the shooting of the first and second frames as done with systems such as that disclosed in the '491 patent.

Flow diagrams and timing diagrams relevant to operation of the system of the invention are shown in FIGS. 2A-2B and 3A-3B. In accordance with the invention, a normal mode of operation is for data to be recorded onto film F adjacent to a frame N by the data recording head 20 under control of microcomputer 26 following pursuit of a termination signal from exposure control circuit 31 relating to exposure to frame N and prior to exposure of a next advanced frame N+1. Microcomputer 26 functions to activate drive control circuit 32 to advance the film, upon receipt of a signal from exposure control circuitry 31 when the shutter release is in its touch or bottom of pretravel position. The condition for encoding the film is that the film advance mode is active.

FIGS. 2A-2B illustrate logic sequences usable where a "data entry complete" button switch 28 is utilized as a manually entered signal to the camera system. As shown in FIG. 2A, the film advance will be energized and data in display 30 cleared (block 100), when the frame N exposure is complete (block 101) and either the "data entry complete" is active (block 102) or the shutter release for exposure N+1 is in the bottom of pretravel (block 103), indicating that the next exposure is about to be made.

A data entry reminder annunciator 35 (FIG. 1) may optionally be employed to remind a user to enter data where data is not entered. A logic sequence for actuation of a data entry reminder is shown in FIG. 2B. Conditions for energizing the reminder 35 (block 104) are that the frame N has been exposed (block 105), the "data entry complete" button 28 has not been actuated (block 106), and the shutter release has been moved to a preexposure position with respect to exposure of the frame N+1 (block 107). The display 30 may be controlled by microcomputer 26 to display the words "enter data" (block 108) in alphanumeric characters at any time that the exposure of a frame N is complete (block 105) and switch 28 representing manual signaling of data entry completion (block 106) has not been actuated.

FIGS. 3A and 3B respectively illustrate exemplary timing sequences for a conventional motor drive camera system (FIG. 3A) and an embodiment of a motor drive control and data entry system in accordance with the invention.

Those skilled in the art to which the invention relates will appreciate that other substitutions and modifications can be made to the described embodiment without departing from the spirit and scope of the invention as described by the claims below.

What is claimed is:

1. Apparatus for control of film transport and data entry during the frame-to-frame advance of a filmstrip between exposures relative to an exposure station in a still camera, comprising:
   a motor;
   drive means operatively associated with said motor for transporting a strip of film, after said film is loaded in said camera and a first frame thereof is exposed, to a position of alignment of a second unexposed frame at the exposure station;
   an exposure gate;
   exposure control means for performing a sequence of actions to operate said exposure gate to expose said second frame;
   signal means for generating a signal at the initiation of said second frame exposure sequence by said exposure control means;
   means cooperable with said drive means for initiating advance of said film to bring said second frame to said exposure station in response to said signal; and
   data entry means for entering data on said film in correlation with said first frame after exposure of said first frame and before exposure of said second frame.

2. Apparatus as in claim 1, wherein said signal means is a first signal means for generating a first signal; said apparatus further comprises second signal means for generating a second signal responsive to user-initiated indication of data entry completion; and said means for initiating advance of said film comprises means to bring said second frame to said alignment position in response to the first to occur of said first and second signals.

3. Apparatus as in claim 2, further comprising annunciator means to provide a data entry reminder signal responsive to said first signal, in the absence of said second signal, to remind a user to enter data.

4. Apparatus as in claim 1, wherein said data entry means comprises a data recording head positioned for entering said data in a marginal location on said film adjacent said first frame.

5. Apparatus as in claim 4, wherein said data recording head comprises a plurality of light emitting diodes.

6. Apparatus as in claim 5, wherein said data entry means further comprises key means for manual input of data; said means for initiating advance includes a microcomputer connected to said key means, to said head, to said drive means and to said exposure control means.

7. Apparatus as in claim 6, wherein said data entry means further comprises a visual display connected to said microcomputer to display data input from said key means.

8. Apparatus as in claim 7, wherein said signal means is a first signal means for generating a first signal; said key means includes a key for generating a second signal responsive to user depression of said key to indicate data entry completion; and said means for initiating advance further comprises means, responsive to said second signal, for providing a visual data entry reminder message on said display after exposure of said first frame until said key has been depressed.

9. Apparatus as in claim 1, wherein said exposure control means includes a shutter release, and said signal means includes means for generating said signal upon user-initiated placement of said shutter release into a preexposure condition.

10. Apparatus for control of film transport and data entry during the frame-to-frame advance of a filmstrip between exposures relative to an exposure station in a still camera, comprising:
    a motor;
    drive means operatively associated with said motor for transporting a strip of film, after said film is loaded in said camera, from a position of alignment of a first frame at the exposure station to a position of alignment of a second frame at the exposure station;
    an exposure gate;

exposure control means for performing a sequence of actions to operate said exposure gate to expose the frame which is in alignment at the exposure station;

signal means for generating a signal at the initiation of said exposure sequence by said exposure control means;

data entry means for entering data on said film in correlation with the frame which is in alignment at the exposure station; and means, responsive to said signal and cooperable with said drive means, for maintaining said first frame in alignment at the exposure station after operation of said exposure gate to expose said first frame, until said exposure sequence is initiated to expose said second frame.

11. Apparatus as in claim 10, wherein said exposure control means includes a shutter release, and said signal means includes means for generating said signal upon user-initiated placement of said shutter release into a preexposure condition.

12. Apparatus as in claim 11, wherein said signal means is a first signal means for generating a first signal; said apparatus further comprises second signal means for generating a second signal responsive to user-initiated indication of data entry completion; and said means for maintaining comprises means for maintaining said first frame in alignment at the exposure station, until the first to occur of said first and second signals.

13. Apparatus as in claim 12, further comprising annunciator means to provide a data entry reminder signal responsive to said first signal, in the absence of said second signal, to remind a user to enter data.

14. Apparatus as in claim 13, wherein said data entry means comprises a keyboard for manual input of data, and a visual display for display of entered data; and said means for maintaining includes a microcomputer connected to said keyboard, to said display, to said drive means, to said first signal means, and to said second signal means.

15. A method for control of film transport and data entry during the frame-to-frame advance of a filmstrip between exposures relative to an exposure station in a still camera having a capability for entering data on said film in correlation with said frames, said method comprising the steps of:

transporting a strip of film, after said film is loaded in said camera and using a film wind drive motor, to bring a first frame thereof into alignment with the exposure station and into alignment with data entry means for entering data on said film in correlation with said first frame;

performing a sequence of actions to operate an exposure gate to expose said first frame;

initiating said sequence of actions to operate said exposure gate to expose said second frame;

generating a signal in response to the initiation of said second frame exposure sequence; and transporting said film using said drive motor to bring said second frame into alignment with said exposure station in response to said signal.

16. A method as in claim 15, wherein said step of initiating said sequence to expose said second frame includes placing a shutter release into a preexposure condition; and said signal is generated in response to said preexposure condition; whereby said advance of said film from alignment of said first frame to alignment of said second frame with said exposure gate is delayed until said shutter release is placed into said preexposure condition preparatory to exposing said second frame.

17. A method as in claim 16, further comprising the step of, in response to said preexposure signal, providing an annunciator signal to remind a user to enter data, if said preexposure signal is generated without data having been entered after exposure of said first frame.

* * * * *